(12) United States Patent
Richardson et al.

(10) Patent No.: US 11,332,199 B2
(45) Date of Patent: May 17, 2022

(54) DEVICE FOR REINFORCING, SEALING OR DAMPING A STRUCTURAL ELEMENT

(71) Applicant: SIKA TECHNOLOGY AG, Baar (CH)

(72) Inventors: Brett Richardson, Royal Oak, MI (US); Larry Lanore, Dryden, MI (US)

(73) Assignee: SIKA TECHNOLOGY AG, Baar (CH)

( * ) Notice: Subject to any disclaimer, the term of this patent is extended or adjusted under 35 U.S.C. 154(b) by 84 days.

(21) Appl. No.: 16/755,424

(22) PCT Filed: Nov. 6, 2018

(86) PCT No.: PCT/EP2018/080251
§ 371 (c)(1),
(2) Date: Apr. 10, 2020

(87) PCT Pub. No.: WO2019/096618
PCT Pub. Date: May 23, 2019

(65) Prior Publication Data
US 2020/0262492 A1 Aug. 20, 2020

(30) Foreign Application Priority Data
Nov. 14, 2017 (EP) .................................... 17201685

(51) Int. Cl.
*B62D 27/02* (2006.01)
(52) U.S. Cl.
CPC .................................. *B62D 27/026* (2013.01)
(58) Field of Classification Search
CPC ..... B62D 27/026; B62D 29/002; B62D 25/00
USPC .......................................................... 296/29
See application file for complete search history.

(56) References Cited

U.S. PATENT DOCUMENTS

| 6,413,611 B1* | 7/2002 | Roberts | B62D 29/002 296/193.06 |
| 6,729,425 B2* | 5/2004 | Schneider | B62D 29/002 180/68.5 |
| 6,988,585 B2* | 1/2006 | Mourieras | B62D 29/002 181/204 |

(Continued)

FOREIGN PATENT DOCUMENTS

| EP | 1 391 368 A2 | 2/2004 | |
| WO | 01/83206 A1 | 11/2001 | |
| WO | WO-03089221 A1 * | 10/2003 | ........... B62D 29/002 |

OTHER PUBLICATIONS

Feb. 15, 2019 Search Report issued in International Patent Application No. PCT/EP2018/080251.

(Continued)

*Primary Examiner* — Pinel E Romain
(74) *Attorney, Agent, or Firm* — Oliff PLC

(57) ABSTRACT

A device for reinforcing, sealing or damping a structural element in a motor vehicle includes: a support with a fastening element for prefixing the device in the structural element; and an expandable adhesive arranged on the support for connecting the support to the structural element; wherein the fastening element is arranged on an elevation of the support, wherein the elevation is raised from a surrounding surface of the support, and wherein the expandable adhesive is arranged at least partially around the elevation on the surrounding surface of the support.

14 Claims, 3 Drawing Sheets

(56) References Cited

U.S. PATENT DOCUMENTS

| | | | | |
|---|---|---|---|---|
| 7,479,246 B2 * | 1/2009 | Muteau | ............... | B29C 44/385 |
| | | | | 264/218 |
| 7,784,186 B2 * | 8/2010 | White | ............... | B62D 29/002 |
| | | | | 29/897.2 |
| 7,913,814 B2 * | 3/2011 | Duffin | ............... | B60R 13/08 |
| | | | | 181/294 |
| 7,926,179 B2 * | 4/2011 | Gray | ............... | B62D 29/002 |
| | | | | 29/897.2 |
| 8,087,916 B2 * | 1/2012 | Kanie | ............... | B29C 44/12 |
| | | | | 425/4 R |
| 8,967,327 B2 * | 3/2015 | Synnestvedt | ......... | B62D 29/002 |
| | | | | 181/284 |

OTHER PUBLICATIONS

May 19, 2020 International Preliminary Report on Patentability issued in International Patent Application No. PCT/EP2018/080251.

* cited by examiner

DEVICE FOR REINFORCING, SEALING OR DAMPING A STRUCTURAL ELEMENT

The invention relates to a device for reinforcing, sealing or damping a structural element, comprising a support and an expandable adhesive. It furthermore relates to a system having a structural element and a device, arranged therein, for reinforcing, sealing or damping the structural element.

Construction elements such as, for example, bodies and/or chassis frames of transportation and conveyance means, in particular of aquatic or terrestrial vehicles or of aircraft, in many instances have structures having cavities in order for lightweight constructions to be enabled. However, these cavities cause a wide variety of problems. Depending on the type of the cavity, the latter has to be sealed in order to prevent the ingress of moisture and contaminations which can lead to corrosion of the construction elements. It is often also desirable for the cavities and thus the construction element to be substantially reinforced but for the low weight to be maintained. It is often also necessary for the cavities and thus the construction elements to be stabilized in order for noises which would otherwise be transmitted along the cavity or through the latter to be reduced. Many of these cavities have an irregular shape or tight dimensions, on account of which it becomes difficult to properly seal, reinforce, and damp said cavities.

Baffle elements are therefore used in particular in the automotive industry but also in the aviation and nautical industry in order for cavities to be sealed and/or to be acoustically partitioned, or reinforcement elements are used in order for cavities to be reinforced.

FIG. 1 shows, schematically, a body of a motor vehicle. The body 10 herein has various structures having cavities such as, for example, pillars 14 and supports or stays 12, respectively. Such structural elements 12, 14 having cavities are usually sealed or reinforced, respectively, using sealing and/or reinforcement elements 16.

FIGS. 2a and 2b schematically show a known concept for the sealing and/or reinforcing closure of openings or cavities, respectively, in a motor vehicle.

FIG. 2a herein shows a device 16 prior to an expansion of an expandable material 13. FIG. 2b shows the same device 16 as a component part of the system 1 but after an expansion of the expandable material 13, therefore with the expanded material 13'.

The device 16 is located in a cavity of a body structure such as is illustrated in FIG. 1, for example. A portion of such a structural element 12, 14 of a body is schematically illustrated in FIGS. 2a and 2b. The device 16 comprises a support 11, which has a peripheral area 21. The expandable material 13 herein is arranged substantially on said peripheral area 21 of the support 11.

A gap exists between the device 16 and the structural element 12, 14 prior to the expansion of the expandable material 13. Said gap permits the structural element 12, 14 to be coated in order to achieve an anti-corrosion protection of the structural element 12, 14. The expandable material 13, after said coating, is usually expanded by way of a thermal influence, wherein the expanded material 13' on account thereof closes the gap between the device 16 and the structural element 12, 14. Fixing of the device 16' in the structural element 12, 14 is moreover also simultaneously achieved on account of the expansion of the expandable material 13. A device 16' that is fastened in the structural element 12, 14 in such a manner reinforces the structural element 12, 14, on the one hand, and closes the cavity in the structural element 12, 14, on the other hand.

Further known devices 16 comprising a support 11 and an expandable material 13 are illustrated schematically in FIGS. 3 and 4. The devices 16 each comprise a fastening element 5 for prefixing the device 16 in the structural element 12, 14. In these exemplary embodiments, this fastening element 5 is designed as a clip.

Two such clips are arranged laterally on a side surface of the support 11 in FIG. 3. In FIG. 4, a clip of this kind is arranged on a cover surface of the support 11, wherein the clip is embedded in the expandable material 13.

Particularly in embodiments such as those in the example shown in FIG. 4, it is disadvantageous that the expandable material 13 may unintentionally be applied to the clip during application to the support 11. During the injection molding process which is typically used for such devices, there is the tendency for the expandable material 13 to rise up the clip in an uncontrolled manner during molding. This may have a disadvantageous effect during the rest of the process, e.g. during demolding.

It is therefore the underlying object of the invention to make available an improved device for reinforcing, sealing or damping a structural element which does not have the abovementioned disadvantages. In particular, the intention is to improve the device in the area of a fastening element in respect of production of the device, namely in respect of attachment of the expandable material to the support.

This object is achieved by a device for reinforcing, sealing or damping a structural element in a motor vehicle, comprising: a support with a fastening element for prefixing the device in the structural element; and an expandable adhesive arranged on the support for connecting the support to the structural element; wherein the fastening element is arranged on an elevation of the support, wherein the elevation is raised from a surrounding surface of the support, and wherein the expandable adhesive is arranged at least around said elevation on the surrounding surface of the support.

This solution has the advantage that, during the application (in particular injection molding) of the expandable adhesive to the support, the adhesive is kept away from the fastening element by the elevation. Given suitable dimensioning of the elevation, the adhesive can flow around the elevation but without flowing over the elevation. It is thereby possible to prevent contact between the adhesive and the clip, and the associated difficulties.

It is a core concept of the present invention that it is not absolutely essential to arrange the expandable adhesive to cover the surface in the area of the fastening element. By raising the fastening element out of the plane of the directly surrounding support surface, as specified by the invention, the difficulties described above can be avoided.

In an exemplary embodiment, a cover surface of the elevation is free of expandable adhesive.

In one exemplary embodiment, the elevation has a height of at least 1 mm, so that the cover surface of the elevation is at least 1 mm above the surrounding surface of the support (11). In one exemplary refinement, the height is at least 1.2 mm, or at least 1.4 mm, or at least 1.6 mm, or at least 1.8 mm, or at least 2 mm.

In one exemplary embodiment, the elevation has a height of at most 10 mm, so that the cover surface of the elevation is at most 10 mm above the surrounding surface of the support. In one exemplary refinement, the height is at most 9 mm, or at most 8 mm, or at most 7 mm, or at most 6 mm, or at most 5 mm.

Depending on the desired layer thickness of the expandable adhesive, the height of the elevation can be adapted to the respective requirements.

In one exemplary embodiment, the elevation has a width of 5 mm to 20 mm, preferably of 6 mm to 17 mm, particularly preferably of 7 mm to 15 mm.

In one exemplary embodiment, the elevation has a length of 5 mm to 30 mm, preferably of 7 mm to 25 mm, particularly preferably of 8 mm to 20 mm.

In one exemplary embodiment, the elevation has substantially three or four side surfaces.

Thus, the elevation can have a substantially triangular or quadrilateral outline, for example.

This has the advantage that demolding of the support with the elevation is easier than would be the case with more complicated outlines of the elevation. Given a suitable arrangement, it is possible for such an outline of the elevation to be demolded by pushing sideways and then pulling off, for example.

In one exemplary embodiment, at least one of the side surfaces of the elevation is formed perpendicularly to the surrounding surface of the support.

In one exemplary embodiment, at least one of the side surfaces of the elevation is inclined, so that the elevation in this area forms an overhang over the surrounding surface of the support or so that a cross section of the support has an undercut in this area.

This has the advantage that significantly better securing of the expandable adhesive on the support can thereby be achieved. The undercut improves the bonding of the adhesive both before expansion and during and after expansion. During this process, the undercut interlocks the adhesive and the support mechanically.

In one exemplary embodiment, two or three of the side surfaces of the elevation are inclined, so that the elevation in these areas forms an overhang over the surrounding surface of the support or so that a cross section of the support has an undercut in these areas, and wherein the remaining side surfaces of the elevation are designed in such a way that, in these areas, the elevation does not form an overhang over the surrounding surface of the support or so that a cross section of the support does not have an undercut in these areas.

This has the advantage that further improved bonding of the adhesive to the support can thereby be achieved. The variant embodiment with three undercut side surfaces is particularly advantageous because, in this case, optimum bonding of the adhesive to the support with simultaneous retention of demoldability from the injection mold is ensured.

In one exemplary embodiment, the expandable adhesive is arranged on the surrounding surface of the support in such a way that the expandable adhesive is in contact with all the side surfaces of the elevation.

This has the advantage that, once again, bonding of the adhesive to the support is thereby improved.

In one exemplary embodiment the support and the fastening element are configured so as to be integral.

This has the advantage that a cost-optimized device can thereby be made available.

In one exemplary embodiment, the fastening element is designed as a clip, wherein the clip can be latched into an opening in the structural element to prefix the device in the structural element.

In one exemplary embodiment, the clip has a first wing, a second wing and a base on an axis, and wherein said axis is substantially parallel to a side surface of the elevation which does not have an overhang or undercut.

This has the advantage that demoldability of the device from an injection mold can thereby be ensured.

In one exemplary embodiment, the expandable adhesive forms a single cohesive element. In an alternative embodiment, a plurality of non-cohesive expandable adhesives forms a plurality of non-cohesive elements.

In one exemplary embodiment the expandable adhesive has an expansion rate of 300 to 3000%. In one exemplary refinement, the expandable adhesive has an expansion rate of between 1000 and 2700% or between 1500 and 2500%.

An exemplary material with an expansion rate of this kind can be obtained under the trade name SikaBaffle® 450.

In an alternative embodiment, the expandable adhesive has an expansion rate of 50 to 500%. In one exemplary refinement, the expandable adhesive has an expansion rate of between 70 and 400% or between 100 and 300%.

An exemplary material with an expansion rate of this kind can be obtained under the trade name SikaReinforcer® 450.

The support may consist of any desired materials. Preferred materials are plastics materials, in particular polyurethanes, polyamides, polyesters, and polyolefins, preferably high-temperature-resistant polymers such as poly(phenylene ether), polysulphones, or polyether sulphones, which are in particular also foamed; metals, in particular aluminum and steel; or grown organic materials, in particular wood or other (densified) fibrous materials, or glass-type or ceramic materials; especially also foamed materials of this type; or arbitrary combinations of said materials. Polyamide, in particular polyamide 6, polyamide 6.6, polyamide 11, polyamide 12 or a mixture thereof, is particularly preferably used. Combinations with fibers such as, for example, glass fibers or carbon fibers, are also possible.

Furthermore, the support may have any desired construction and any desired structure. It may be solid, hollow, or foamed, or have a grid-like structure, for example. The surface of the support may typically be smooth, rough, or structured.

In the case of sealing and reinforcement elements according to the invention in which the expandable material is located on a support, the production method differs according to whether the support is or is not composed of a material that is capable of being processed by injection molding. In the affirmative, a two-component injection molding process is usually used. Herein a first component, in this case the support element, is injected first. After the solidification of said first component, the cavity in the tool is enlarged or adapted, respectively, or the injection-molded product is laid up in a new tool, and the first component is overmolded with a second component, in this case the expandable material, by way of a second injection apparatus.

If the support element is composed of a material which cannot be made by the injection molding process, thus from a metal, for example, the support is laid up in a respective tool and the support is overmolded with the expandable material. There is of course also the possibility for the expandable material to be fastened to the support by way of special fastening means or methods.

In one exemplary embodiment, the expandable adhesive is arranged on the support by means of an injection molding process.

In one exemplary embodiment, the support is made by an injection molding process.

In one exemplary embodiment, the support comprises a plastic, in particular polyamide.

The object cited initially is moreover achieved by a system of a reinforced, sealed or damped structural element in a motor vehicle, the system comprising: a structural element; a device in accordance with the above description, wherein the device is arranged in the structural element; and wherein the adhesive is expanded and connects the support and the structural element together.

Details and advantages of the invention will be described below on the basis of exemplary embodiments and with reference to schematic drawings, in which.

Figure 1:
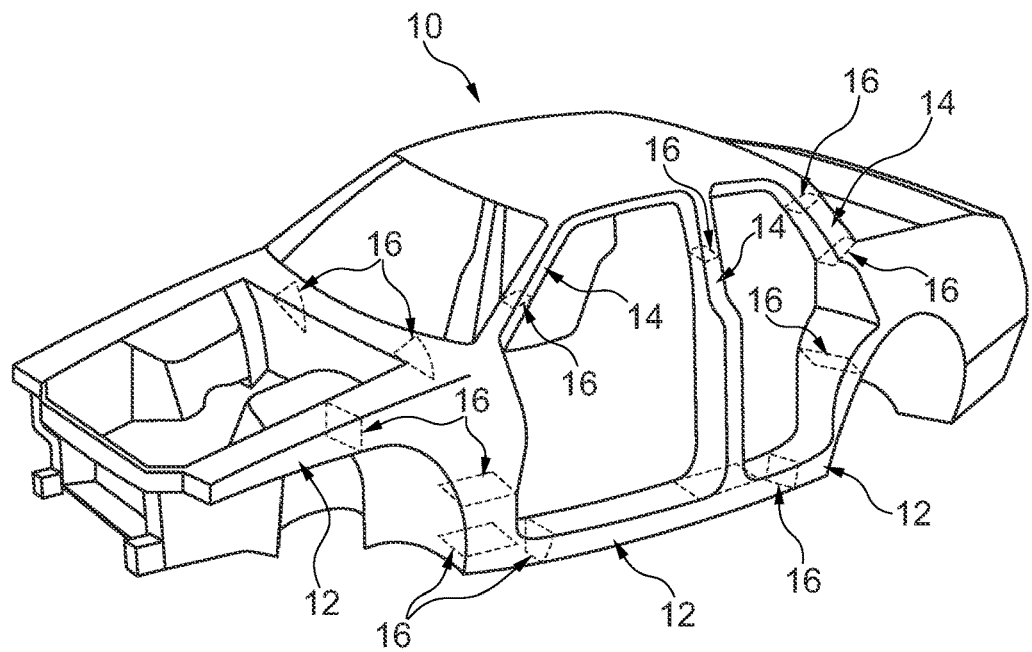
FIG. 1 shows an exemplary illustration of a body according to the prior art.
Figure 2A:
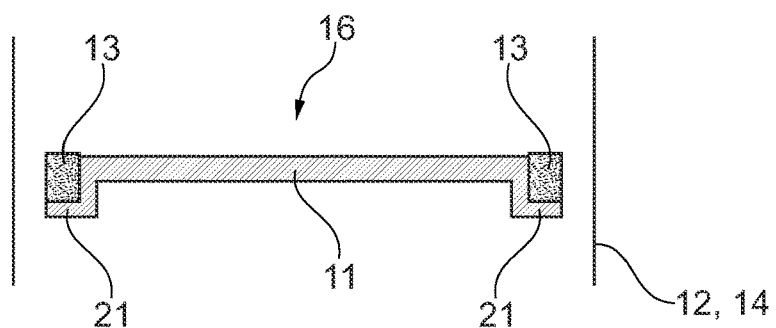
FIGS. 2a and 2b show schematic illustrations of an exemplary device according to the prior art.
Figure 2B:
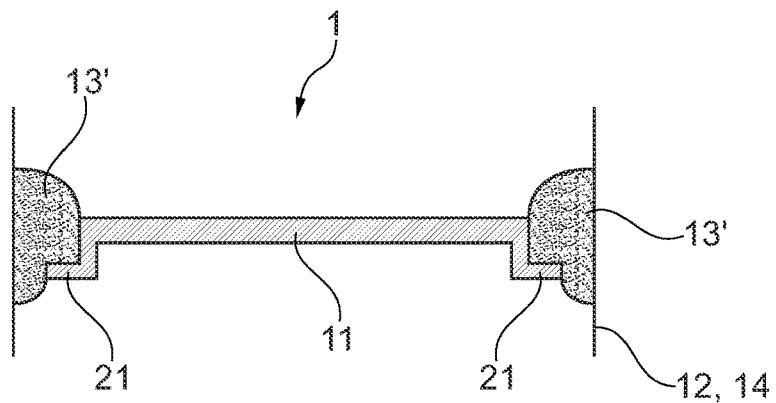
Figure 3:
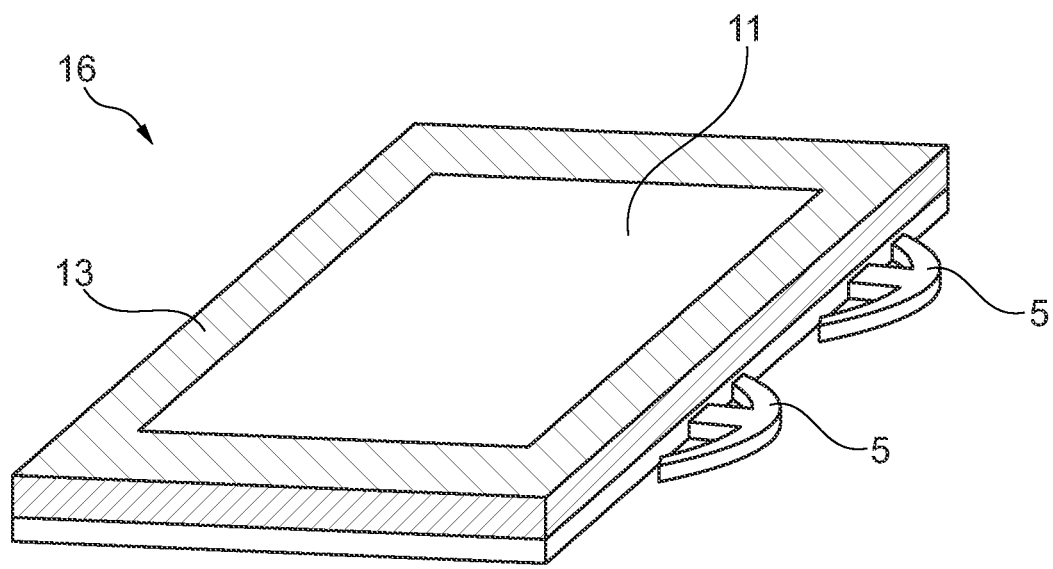
FIGS. 3 and 4 show a schematic illustration of an exemplary device according to the prior art.
Figure 4:
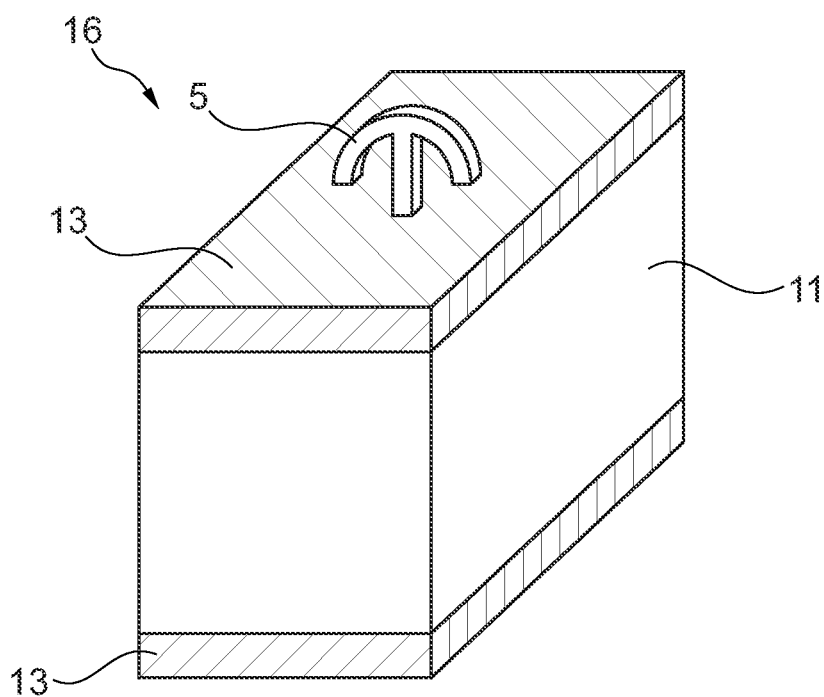
Figure 5:
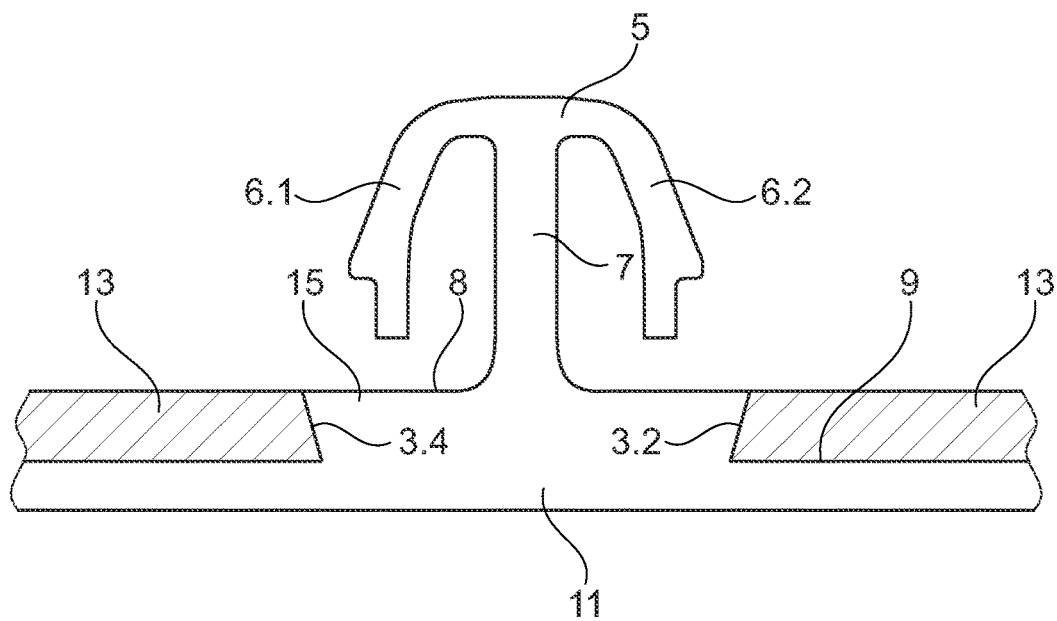
FIG. 5 shows a schematic illustration of a cross section through an exemplary device in the area of a fastening element.

FIG. 5 illustrates an exemplary device in the area of a fastening element 5 in cross section. In this exemplary embodiment, the fastening element 5 is designed as a clip and has a first wing 6.1, a second wing 6.2 and a base 7, on which the wings 6.1, 6.2 are fastened.

The fastening element 5 is arranged on an elevation 15, which rises up above a surrounding surface 9 of the support 11. In this case, the elevation 9 has a cover surface 8, on which the fastening element 5 is arranged, and side surfaces 3.2, 3.4.

In this case, the side surfaces 3.2, 3.4 are formed with an undercut, so that, in this area, the elevation 15 forms an overhang over the surrounding surface 9 of the support 11.

The expandable adhesive 13 is arranged on the surrounding surface 9 of the support 11. By means of the undercut of the elevation 15, the expandable adhesive 13 and the support 11 are interlocked mechanically. This improves bonding of the expandable adhesive 13 to the support 11 before, during and after an expansion of the adhesive 13.

Figure 6:
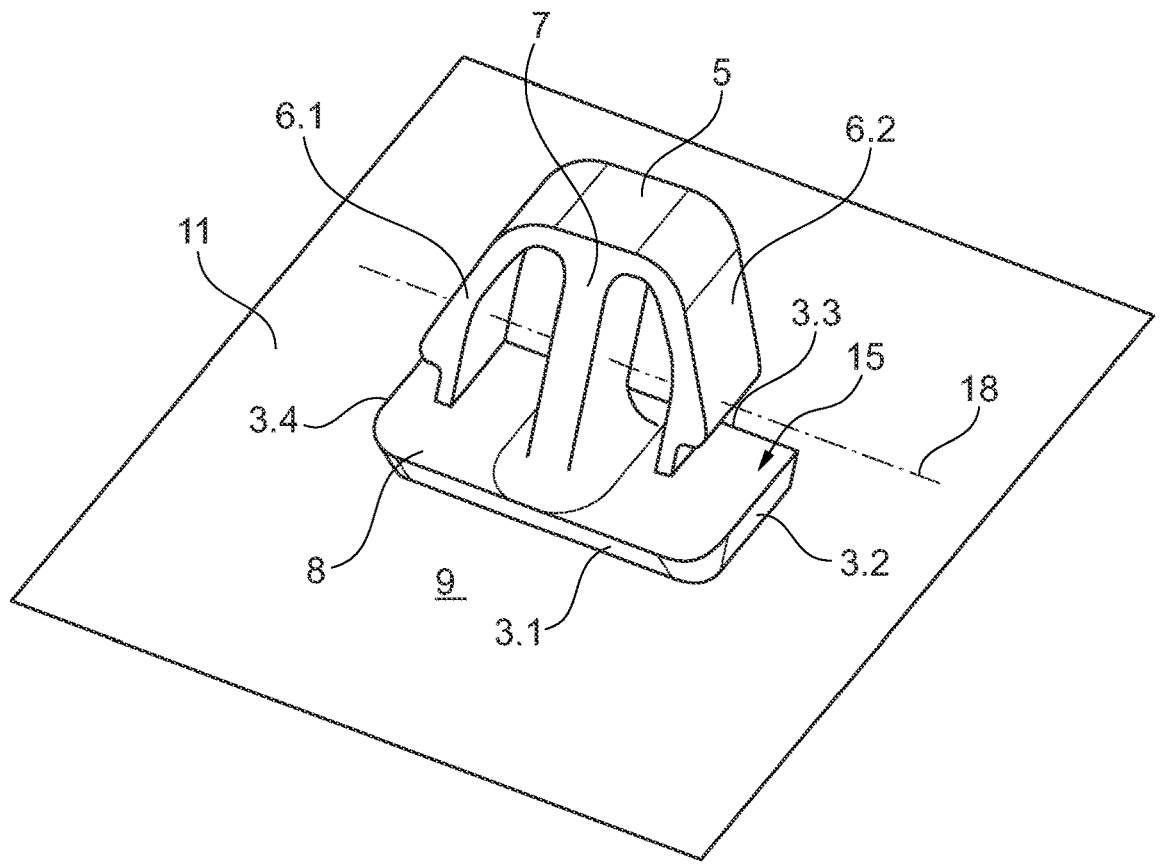
FIG. 6 shows a schematic three-dimensional illustration of an exemplary support in the area of a fastening element.

In FIG. 6, an exemplary support 11 is illustrated schematically in three dimensions in the area of a fastening element 5. Here, the support 11 is shown without the expandable adhesive.

In this example, the elevation 15 has substantially four side surfaces 3.1, 3.2, 3.3, 3.4, wherein three side surfaces 3.1, 3.2, 3.4 are formed with an undercut and the remaining side surface 3.3 is not formed with an undercut. In this way, demoldability of the support 11 during injection molding is ensured.

It can furthermore be seen here that the base 7 and the wings 6.1, 6.2 of the clip are arranged along one axis 18. In this case, said axis 18 lies substantially parallel to the side surface 3.3 of the elevation 15 which is not formed with an undercut.

The invention claimed is:

1. A device for reinforcing, sealing or damping a structural element in a motor vehicle, comprising:
a support with a fastening element for prefixing the device in the structural element; and
an expandable adhesive arranged on the support for connecting the support to the structural element;
wherein (i) the fastening element is arranged on an elevation of the support, (ii) the elevation is raised from a surrounding surface of the support and has at least one side surface, (iii) the expandable adhesive is arranged at least partially around said elevation on the surrounding surface of the support, and (iv) the fastening element is designed as a clip that has a first wing, a second wing, and a base arranged along an axis, the axis being substantially parallel to a side surface of the elevation which does not form an overhang or undercut.

2. The device as claimed in claim 1, wherein a cover surface of the elevation is free of expandable adhesive.

3. The device as claimed in claim 1, wherein the elevation has a height of at least 1 mm, so that a cover surface of the elevation is at least 1 mm above the surrounding surface of the support; and/or
wherein the elevation has a height of at most 10 mm, so that the cover surface of the elevation is at most 10 mm above the surrounding surface of the support.

4. The device according to claim 1, wherein the elevation has substantially three or four side surfaces.

5. The device according to claim 1, wherein the elevation has at least one side surface that is formed perpendicularly to the surrounding surface of the support.

6. The device according to claim 1, wherein the elevation has at least one side surface that is inclined, so that the elevation in this area forms an overhang over the surrounding surface of the support or so that a cross section of the support has an undercut in this area.

7. The device according to claim 1, wherein the elevation has two or three side surfaces that are inclined, so that the elevation in these areas forms an overhang over the surrounding surface of the support or so that a cross section of the support has an undercut in these areas, and wherein remaining side surfaces of the elevation, other than the two or three side surfaces that are inclined, are designed in such a way that, in these areas, the elevation does not form an overhang over the surrounding surface of the support or so that a cross section of the support does not have an undercut in these areas.

8. The device according to claim 1, wherein the expandable adhesive is arranged on the surrounding surface of the support in such a way that the expandable adhesive is in contact with all side surfaces of the elevation.

9. The device according to claim 1, wherein the expandable adhesive is arranged on the support by an injection molding process.

10. The device according to claim 9, wherein the support is made by an injection molding process.

11. The device according to claim 1, wherein the support comprises a plastic.

12. The device according to claim 1, wherein the support and the fastening element are formed integrally.

13. The device according to claim 1, wherein the clip can be latched into an opening in the structural element to prefix the device in the structural element.

14. A system of a reinforced, sealed or damped structural element in a motor vehicle, the system comprising:
a structural element;
a device according to claim 1, wherein
the device is arranged in the structural element; and
wherein the adhesive is expanded and connects the support and the structural element together.

* * * * *